(12) United States Patent
Laskowski et al.

(10) Patent No.: US 12,281,199 B2
(45) Date of Patent: Apr. 22, 2025

(54) POLYCARBONATE POLYMER WITH SILOXANE REPEAT UNITS, COMPOSITIONS, AND METHODS

(71) Applicant: 3M INNOVATIVE PROPERTIES COMPANY, St. Paul, MN (US)

(72) Inventors: Carl A. Laskowski, Minneapolis, MN (US); Paul B. Armstrong, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 18/706,766

(22) PCT Filed: Jan. 18, 2023

(86) PCT No.: PCT/IB2023/050436
§ 371 (c)(1),
(2) Date: May 2, 2024

(87) PCT Pub. No.: WO2023/152575
PCT Pub. Date: Aug. 17, 2023

(65) Prior Publication Data
US 2025/0002645 A1    Jan. 2, 2025

Related U.S. Application Data

(60) Provisional application No. 63/309,044, filed on Feb. 11, 2022.

(51) Int. Cl.
| | | |
|---|---|---|
| C08G 64/18 | (2006.01) | |
| C08G 64/02 | (2006.01) | |
| C08G 64/34 | (2006.01) | |
| C08G 64/38 | (2006.01) | |
| C08G 64/42 | (2006.01) | |
| C08L 33/14 | (2006.01) | |
| C08L 69/00 | (2006.01) | |
| C09D 4/06 | (2006.01) | |
| C09D 169/00 | (2006.01) | |
| C08F 2/48 | (2006.01) | |

(52) U.S. Cl.
CPC ....... *C08G 64/186* (2013.01); *C08G 64/0266* (2013.01); *C08G 64/34* (2013.01); *C08G 64/38* (2013.01); *C08G 64/42* (2013.01); *C08L 33/14* (2013.01); *C08L 69/00* (2013.01); *C09D 4/06* (2013.01); *C09D 169/00* (2013.01); *C08F 2/48* (2013.01); *C08G 64/0291* (2013.01); *C08G 2150/00* (2013.01); *C08L 2312/00* (2013.01)

(58) Field of Classification Search
None
See application file for complete search history.

(56) References Cited

U.S. PATENT DOCUMENTS 3,563,941 A * 2/1971 Plueddemann .......... C09G 1/12
106/270
2021/0230361 A1    7/2021 Subhani et al.

FOREIGN PATENT DOCUMENTS

JP    11130857    * 10/1999

OTHER PUBLICATIONS

ShinEtsu Reactive & Non-Reactive Modified Silicone Fluid (2023) pp. 1-10. (Year: 2023).*
Nishitsuji; Molecular Weight Dependence of the Physical Aging of Polycarbonate Polymer 178 (2019) 121571 pp. 1-7. (Year: 2019).*
ShinEtsu Silicones for Resin Modification (2015) pp. 1-12. (Year: 2015).*
Darensbourg; Probing the Mechanistic Aspects of the Chromium Salen Catalyzed Carbon Dioxide/Epoxide Copolymerization Process . . . Catalysis Today 98 (2004) pp. 485-492. (Year: 2004).*
Andrea, "Functionalized Polycarbonates Via Triphenylborane Catalyzed Polymerization-Hydrosilylation", RSC Advances, 2019, vol. 9, pp. 26542-26546.
Carlotti, et al., "Cyclic Monomers: Epoxides, Lactide, Lactones, Lactams, Cyclic Silicon-Containing Monomers, Cyclic Carbonates, and Others", Anionic Polymerization_Principles, Practice, Strength, Consequences and Applications, (2015), pp. 191-305.
Coates, "Discrete Metal-Based Catalysts for The Copolymerization of CO2 And Epoxides: Discovery, Reactivity, Optimization, And Mechanism", Angewandte Chemie, 2004, vol. 43, pp. 6618-6639.
Darensbourg, et al., "Catalytic Coupling of Cyclopentene Oxide and CO2 Utilizing Bifunctional (salen)Co(III) and (salen)Cr(III) Catalysts: Comparative Processes Involving Binary (salen)Cr(III) Analogs", ACS Catalysis, vol. 3, (2013), pp. 3050-3057.

(Continued)

*Primary Examiner* — David J Buttner
(74) *Attorney, Agent, or Firm* — Carolyn A. Fischer

(57) ABSTRACT

Polycarbonate polymers comprising non-aromatic cyclic groups bonded with carbonate linking groups are described. A portion of the non-aromatic cyclic groups comprise a substituent having siloxane repeat units. Representative formulas of the substituents having siloxane repeat units include —CH$_2$—CH$_2$—Si(R$^4$)$_2$—(OSi(R$^4$)$_2$—R$^5$, and —CH[Si(R$^4$)$_2$—(OSi(R$^4$)$_2$)$_m$—R$^5$]—CH$_3$; wherein m is the number of siloxane repeat units; and R$^4$ and R$^5$ are independently alkyl, aryl, aralkyl or aralkylene. The polycarbonate polymer C typically comprises a high concentration of carbonate linking group, for example in an amount of at least 85 or 90 mol % or greater N based on the total linking groups of the polymer. Also described are compositions comprising the polycarbonate polymer and methods of making.

19 Claims, No Drawings

(56) References Cited

OTHER PUBLICATIONS

Inoue, "Copolymerization of Carbon Dioxide and Epoxide with Organometallic Compounds", Die Makromolekulare Chemie, 1969, vol. 130, No. 1, pp. 210-220.
International Search report for PCT International Application No. PCT/IB2020/050436, mailed on Apr. 24, 2023, 4 pages.
Liu, et al. "Crystalline Stereocomplexed Polycarbonates: Hydrogen-Bond-Driven Interlocked Orderly Assembly of the Opposite Enantiomers", Angewandte Chemie, vol. 54, (2015), pp. 2241-2244.
Mollah, "Synthesis and Characterization of Grafted Silicone Polycarbonates", Journal of Macromolecular Science, Part A, 2011, vol. 48, pp. 400 408.
Nozaki, "Optically Active Polycarbonates: Asymmetric Alternating Copolymerization of Cyclohexene Oxide and Carbon Dioxide", Journal of the American Chemical Society, 1999, vol. 121, p. 11008-11009.

* cited by examiner

POLYCARBONATE POLYMER WITH SILOXANE REPEAT UNITS, COMPOSITIONS, AND METHODS

SUMMARY

Presently described are polycarbonate polymers comprising non-aromatic cyclic groups bonded with carbonate linking groups. A portion of the non-aromatic cyclic groups comprise a substituent having siloxane repeat units.

Representative formulas of the substituents having siloxane repeat units include

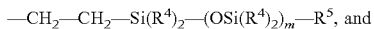

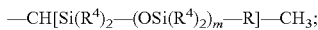

wherein m is the number of siloxane repeat units; and $R^4$ and $R^5$ are independently alkyl, aryl, aralkyl or aralkylene.

The polycarbonate polymer typically comprises a high concentration of carbonate linking group, for example in an amount of at least 85 or 90 mol % or greater based on the total linking groups of the polymer. Thus, the amount of non-carbonate (e.g. ether) groups are typically less than 15 or 10 mol % or less. The high concentration of carbonate linking groups contributes to degradability of the polycarbonate polymer. Lower thermogravimetric mass loss onset temperatures can be indicative of improved degradability. In some embodiments, the thermogravimetric mass loss onset temperature is in the range from 220-300° C.

The polycarbonate polymer can be represented by the formula:

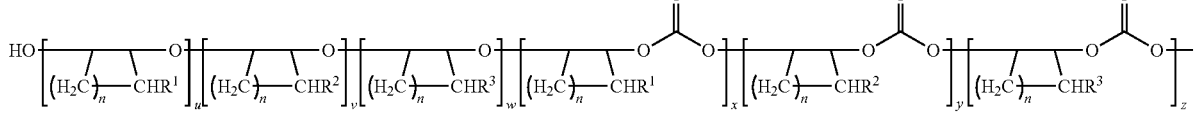

wherein n independently ranges from 1 to 5,
$R^1$ is vinyl,
$R^2$ is hydrogen,
$R^3$ is independently $-CH_2-Si(R^4)_2-(OSi(R^4)_2)_m-R^5$ or $-[Si(R^4)_2-(OSi(R^4)_2)_m-R^5]-CH_3$,
m is the number of siloxane repeat units,
$R^4$ and $R^3$ are independently alkyl, aryl, aralkyl or aralkylene, and
u, v, w, x, y, and z are the number of each polymerized units.

In some embodiments, u+v+w is a value such that the polycarbonate polymer comprises no greater than 15 or 10 mol % of polymerized units comprising non-carbonate (e.g. ether) linking groups.

The polycarbonate polymer can be further characterized by physical properties such as molecular weight and glass transition temperature (Tg).

The inclusion of substituents having siloxane repeat units typically decreases the Tg relative to the same polycarbonate polymer lacking substituents having siloxane repeat units.

The inclusion of substituents having siloxane repeat units typically increases the (e.g. receding) contact angle with water relative to the same polycarbonate polymer lacking substituents having siloxane repeat units.

The polycarbonate polymer alone or copolymerized with another ethylenically unsaturated material can be utilized as a low surface energy film or coating.

The inclusion of polymerized units comprising vinyl groups is amenable to copolymerizing the polycarbonate polymer with other ethylenically unsaturated materials.

In another embodiment, a composition is described comprising the reaction product of at least one ethylenically unsaturated material and the polycarbonate polymer described herein.

Also described are methods of making the described polycarbonate polymer.

DETAILED DESCRIPTION

Presently described are polycarbonate polymers comprising non-aromatic cyclic groups bonded with carbonate linking groups. A portion of the non-aromatic cyclic groups comprise a substituent having siloxane repeat units. The non-aromatic cyclic group may also be characterized as a cycloaliphatic group or a cycloalkane group. The siloxane repeat units are typically bonded to the non-aromatic cyclic group with an ethylene linking group.

In one embodiment, the substituent comprising siloxane repeat units has the formula:

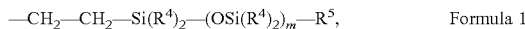      Formula 1 wherein $R^4$ and $R^5$ are independently alkyl, aryl, aralkyl or aralkylene and m is the number of siloxane repeat units.

When a vinyl-substituted cycloalkyl epoxide or a vinyl-substituted cycloalkyl cyclic carbonate is utilized in the synthesis of the polycarbonate polymer, the substituent comprising siloxane repeat units is predominantly represented by Formula 1.

In another embodiment, the substituent comprising siloxane repeat units having the formula:

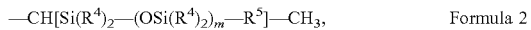      Formula 2 wherein $R^4$ and $R^5$ are independently alkyl, aryl, aralkyl or aralkylene and m is the number of siloxane repeat units.

In some embodiments, the polycarbonate polymer described herein comprises a combination of substituents comprising siloxane repeat units according to Formula 1 and Formula 2.

Siloxane containing repeat units may be the product of hydrosilylation either of a monomer prior to polymerization of the polycarbonate polymer or of a polycarbonate copolymer comprising pendant vinyl groups. One skilled in the art appreciates the inherent selectivity of a hydrosilylation reaction is dependent on the catalyst and method applied (Matisons, J. Hydrosilylation: A Comprehensive Review on Recent Advances. Springer, 2009). Depending on the selection of the hydrosilylation catalyst and hydrosilylation reaction conditions, siloxane repeat units of Formula 2 may also be present. In some embodiments, siloxane repeat units as represented by Formula 2 may be present in greater than 0.20%, 1%, 5%, 10%, 25%, or 45 mol % as expressed by the [mol % of Formula 1/(mol % of formula 1+mole % Formula 2)]. In other embodiments, the amount of siloxane repeat units represented by Formula are less than 45, 25, 10, 5, 1, or 0.2 mol %.

The exact identity of the hydrosilylation catalyst is not critical so long as selective conversion of a pendant olefin is achieved. When a monomer is hydrosilylated prior to polymerization, a preferred catalyst would not lead to significant conversion of preexisting epoxide or cyclic carbonate functionality. Similarly, a preferred catalyst for the hydrosilylation of a polycarbonate precursor containing pendant vinyl groups would not typically mediate significant reduction of carbonate linkages present within the polymer. Examples of appropriate hydrosilylation catalysts include Karstedt's catalyst, $H_2PtCl_6$, $[(cod)Rh(u\text{-}OSiMe_3)]_2$, $[(cod)Ir(Cl)]_2$, and $[La(N(SiMe_3)_2)_3]$ (cod=cyclooctadiene). The hydrosilylation catalyst may be homogenous, heterogenous, or present on a solid support.

$R^4$ and $R^5$ typically independently comprise no greater than 12 carbon atoms. In some embodiments, $R^4$ and $R^5$ are independently alkyl groups. In typical embodiments, $R^4$ is alkyl (e.g. methyl) or aryl (e.g. phenyl). In some embodiments, $R^5$ is a $C_1$-$C_{18}$ alkyl group, such as methyl, propyl, or butyl.

The average number of siloxane repeat units, m, is typically at least about 5, 6, 7, 8, 9 or 10. In some embodiments, the average number of siloxane repeat units, m, is no greater than 70, 60, 50, 40, 30, or 20. As the number of siloxane repeat units increases, the substituent comprising pendent siloxane repeat units, such as depicted by Formulas 1 and 2, may have molecular weight of at least 600 g/mol. In some embodiments, the substituent comprising pendent siloxane repeat units have a molecular weight no greater than 6, 5, 4, 3, 2, or 1 kg/mol.

The polycarbonate polymer described here may be represented by Formula 3, as follows:

In Formula 3, $R^3$ is independently $-CH_2-Si(R^4)_2-(OSi(R^4)_2)_mR^5$ or $-[Si(R^4)_2-(OSi(R^4)_2)_m-R]-CH_3$ wherein m is the number of siloxane repat units and $R^4$ and $R^5$ are independently alkyl, aryl, aralkyl or aralkylene, as previously described.

The subscripts u, v, w, x, y, and z represent the number each polymerized unit.

In favored embodiments, the polycarbonate polymer comprises significantly more carbonate linkages than non-carbonate (e.g. ether) linkages. Thus, the polycarbonate polymer comprises more polymerized units having subscripts x, y, z than those having u, v, and w.

The method of polycarbonate polymerization impacts the amount of u+v+w relative to x+y+z. The "% carbonate linkages" can be defined as (x+y+z)/(u+v+w+x+y+z) which expresses the tendency of the polymerization reaction to incorporate carbon dioxide when epoxide monomers are used as a precursor or maintain a carbonate functionality when cyclic carbonates are used as precursors. Incorporation of carbon dioxide or conservation of carbonate can occur in competition with epoxide homopolymerization or carbon dioxide extrusion, respectively, to form polyether linkages within the polymer mainchain. Degradability of the polycarbonate polymer is impacted by the % of carbonate linkages, with increased degradability favored by high % carbonate linkages. Generally, decreasing the % carbonate linkage value will increase the thermal stability of the polymer relative to a comparative polymer with (x+y+z)/(u+v+w+x+y+z) approaching 1.

In some embodiments, the polycarbonate polymer comprises carbonate linking group in an amount of at least 75, 80 or 85 mol % based on the total linking groups of the

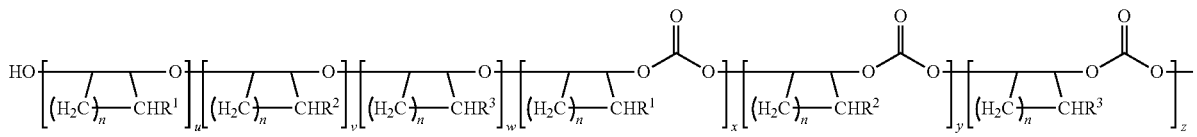

In Formula 3, the non-aromatic cyclic groups comprise at least 4 carbon atoms, i.e. wherein n is 1. Thus, n represents the number of carbon atoms in addition to 3 carbon atoms. Generally, n independently ranges from 1 to 5. Thus, the total number of carbon atoms of the non-aromatic cyclic group ranges from 4 to 8. In some embodiments, the total number of carbon atoms is 5, 6, or 8. One of ordinary skill in the art appreciates that "independently ranges" means that each n is within the range, yet the n of one polymerized group is not necessarily the same as the n of a different polymerized group. For example, n of the polymerized unit with subscript x can be 3 as in the case of cyclohexane; whereas n of the polymerized units with subscript y can be 5 as in the case of cyclooctane. In some embodiments, n of the polymerized groups with subscripts x, y, or z are the same. In some embodiments, n of the polymerized groups of the polycarbonate polymer of Formula 3 are the same. In some embodiments, n is 3 and the cycloaliphatic is cyclohexane.

In Formula 3, $R^1$ is vinyl. The vinyl group can be 1-vinyl, 2-vinyl, or a combination thereof depending on the monomers the polycarbonate polymer was synthesized from, as previously described.

In Formula 3, $R^2$ is hydrogen. Thus, the polymerized units wherein $R^2$ is hydrogen may be characterized as unsubstituted non-aromatic cyclic groups.

polymer. In this embodiment, x+y+z of Formula 3 are a value such that the polycarbonate polymer comprises at least 75, 80, 85, 90 mol % or greater of such polymerized units. When the polycarbonate polymer comprises a high concentration of carbonate linkages as just described, the amount of non-carbonate linkages is less than 25, 20, 15, or 10 mol %. In this embodiment, u+v+w of Formula 3 are a value such that the polycarbonate polymer comprises less than 25, 20, 15, or 10 mol % of such polymerized units. In some embodiments, u is zero. In some embodiments, v is zero. In some embodiments, w is zero.

The polycarbonate polymer described herein comprises polymerized units of unsubstituted non-aromatic cyclic groups. These polymerized units are represented in Formula 3 by polymerized units having $R^2$. In some embodiments, polycarbonate polymer comprises polymerized units of unsubstituted non-aromatic cyclic groups bonded within the polymer backbone with a non-carbonate (e.g. ether) linkage, such as represented by polymerized units with subscript v of Formula 3. When such units are present, the mol % is typically low as previously described. In typical embodiments, the polycarbonate polymer comprises polymerized units of unsubstituted non-aromatic cyclic groups bonded within the polymer backbone with a carbonate linkage, such as represented by polymerized units with subscript y of Formula 3. The polycarbonate polymer typically comprises polymerized units of unsubstituted non-aromatic cyclic groups in an amount ranging from 60 to 98.5 mol %.

In some embodiments, the polycarbonate polymer described herein comprises polymerized units with a vinyl substituent. These polymerized units are represented in Formula 3 by polymerized units having $R^1$. In some embodiments, the polycarbonate polymer comprises non-aromatic cyclic groups comprising a vinyl substituent bonded within the polymer backbone with a non-carbonate (e.g. ether) linkage, such as represented by polymerized units with subscript u of Formula 3. When such units are present, the mol % is typically low as previously described. In some embodiments, the polycarbonate polymer comprises non-aromatic cyclic groups comprising a vinyl substituent bonded within the polymer backbone with a carbonate linkage, such as represented by polymerized units with subscript x of Formula 3.

The polycarbonate polymer typically comprises at least 5, 6, 7, 8, 9 or 10 mol % of polymerized units of non-aromatic cyclic groups comprising a vinyl substituent. In some embodiments, the amount of polymerized units of non-aromatic cyclic groups comprising a vinyl substituent is at least 15, 16, 17, 18, 19, or 20 mol % of the polycarbonate polymer. In some embodiments, the amount of polymerized units of non-aromatic cyclic groups comprising a vinyl substituent is no greater than 30, 25, 20 or 15 mol % of the polycarbonate polymer. The presence of vinyl substituents is amenable to copolymerization of the polycarbonate polymer with other ethylenically unsaturated materials.

The polycarbonate polymer described herein comprises polymerized units with siloxane repeat units. These polymerized units are represented by polymerized units having $R^3$ of Formula 3. In some embodiments, the polycarbonate polymer comprises non-aromatic cyclic groups comprising a substituent with siloxane repeat units bonded within the polymer backbone with a non-carbonate (e.g. ether) linkage, such as represented by polymerized units with subscript u of Formula 3. When such units are present, the mol % is typically low as previously described.

In some embodiments, the polycarbonate polymer comprises non-aromatic cyclic groups comprising a substituent with siloxane repeat units bonded within the polymer backbone with a carbonate linkage, such as represented by polymerized units with subscript x of Formula 3.

The polycarbonate polymer typically comprises at least 0.5, 1, 2, 3, 4, 5, 6, 7, 8, 9 or 10 mol % of polymerized units comprising a substituent with siloxane repeat units. In some embodiments, the amount of polymerized units with siloxane repeat units is no greater than 10, 9, 8, 7, 6, 5, 4, or 3 mol % of the polycarbonate polymer. The presence of substituents comprising siloxane repeat units is amenable to reducing the Tg and lowering the surface energy of the polycarbonate polymer relative to the same polycarbonate polymer lacking substituents comprising siloxane repeat units. In some embodiments, the polycarbonate polymer has a higher advancing contact angle with water than the same polymer without the siloxane substituents. In some embodiments, the advancing contact angle with (deionized) water is at least 105 or 110 degrees. In some embodiments, the receding contact angles with water is at least 70, 75, 80, 85, or 90 degrees.

The amount of vinyl and siloxane groups of the polycarbonate polymer can be determined from Nuclear Magnetic Resonance (NMR).

The molecular weight of the polycarbonate polymer described herein can be determined with Gel Permeation Chromatography (according to the method described in the forthcoming examples). In some embodiments, polycarbonate polymer may have a single peak having a normal distribution of molecular weights. In other embodiments, the polycarbonate polymer may have more than one peak. For example, the polycarbonate polymer may have a bimodal molecular weight distribution. In some embodiments, the polycarbonate polymer is multimodal with each peak having a polydispersity no greater than 4, 3, 2, or 1.5, 1.3, 1.2, or 1.1.

The polycarbonate polymer described herein typically has a weight average molecular weight (Mw) ranging from 5,000 to 1,500,000 g/mol (5 to 1500 kg/mol). In some embodiments, the weight average molecular weight (Mw) is at least 10,000; 15,000; 20,000 or 25,000 g/mol. In some embodiments, the polycarbonate polymer has a weight average molecular weight (Mw) of less than 750,000; 500,000, 250,000, 100,000 g/mol. In some embodiments, the polycarbonate polymer has a weight average molecular weight (Mw) of less than 75,000; 50,000, or 25,000 g/mol.

In some embodiments, (e.g. polydispersity approaching 1), the number average molecular weight is about the same as the weight average molecular weight as just described. In some embodiments, the polycarbonate polymer described herein has a number average molecular weight (Mn) ranging from 5,000 to 750,000 g/mol. In some embodiments, the number average molecular weight (Mn) is at least 10,000; 15,000; 20,000 or 25,000 g/mol. In some embodiments, the polycarbonate polymer has a number average molecular weight (Mn) of less than 500,000, 250,000, 100,000 g/mol. In some embodiments, the polycarbonate polymer has a number average molecular weight (Mn) of less than 75,000; 50,000, or 25,000 g/mol.

Lower molecular weight can be preferred for copolymerizing with other ethylenically unsaturated materials. However, higher molecular weight materials can be preferred for preparing dilute coating solutions in organic solvents.

The glass transition temperature (Tg) of the polycarbonate polymer can be determined using Differential Scanning Calorimetry (DSC) (according to the method described in the forthcoming examples). In some embodiments, the polycarbonate polymer has a Tg of at least 50, 55, or 60° C. In some embodiments, the polycarbonate polymer has a Tg no greater than 115, 110, 100, 95, 90, 85, 80, 75, or 70° C. The Tg of the obtained polycarbonate polymer can be modified by the polymer backbone structure and the siloxane sidechains. The inclusion of higher concentrations of substituents with siloxane repeat units can decrease the Tg. The Tg of the polycarbonate polymer can also be depressed by increasing the value of m in Formulas 1 and 2.

Further modification of the Tg of the polycarbonate polymer can be achieved through judicious selection of the cycloaliphatic group as exemplified by the reported values for cyclopentene polycarbonate (Tg~84.5° C.) and cyclohexane polycarbonate (Tg~117° C., Lu et. al. *Angew. Chem.*, 2015, 54, pg 2241 and Darensbourg et. al. ACS Catalysis, 2013, 3, pg 3050, respectively).

The polycarbonate polymers described herein can be prepared by any suitable method.

One suitable method comprises providing a polycarbonate polymer comprising non-aromatic cyclic groups wherein a portion of the cyclic groups comprise a vinyl moiety; and reacting at least a portion of the vinyl moieties with a material comprising siloxane repeat units and a single hydride group in the presence of a metal catalyst. Suitable metal catalysts include Karstedt's catalyst (platinum-divinyl (tetra)methyl siloxane), $H_2PtCl_6$, $[(cod)Rh(u-OSiMe_3)]_2$, $[(cod)Ir(Cl)]_2$, and $[La(N(SiMe_3)_2)_3]$ (cod=cyclooctadiene). The polycarbonate comprising non-aromatic cyclic groups wherein a portion of the cyclic groups comprise a vinyl moiety can be prepared by reacting a cycloalkene oxide, a vinylcycloalkene oxide, and carbon dioxide in the presence of a catalyst (Coates G. W. et. al. Angew. Chem. 2004, 43, p. 6618).

Various catalysts can be used to form the vinyl functionalized polycarbonate precursor from epoxide monomers and $CO_2$. (See for example Inoue's Inoue, S.; Koinuma, H.; Tsuruta, T. Makromol. *Chem* 1969, 130, pp. 210-220). Examples of other suitable catalysts described in literature include Zn-based catalysts derived from $Zn(CH_2CH_3)_2$ and a number of alcohol or carboxylic acids, Al-based catalysts supported by porphyrin or Schiff-base type ligands, Co-based catalysts supported by porphyrin or Schiff-base type ligands, and some organoborane compounds. Some reported catalysts require the addition of anionic co-catalyst salts. It is recognized that each specific catalyst will have differing reaction conditions to achieve the desired % carbonate linkage, molecular weight, and polydispersity of product polycarbonate. Reaction parameters such as monomer identity, concentration, $CO_2$ pressure, reaction temperature and duration are known to impact the salient properties of the resulting polycarbonate.

Thus, alternating polycarbonate polymers are synthesized by alternating copolymerization of at least two epoxides and carbon dioxide. The at least two epoxides include at least one cycloalkene oxide, such as cyclohexene oxide (CHO), and at least one vinylcycloalkene oxide, such as 4-vinylcyclohexene oxide (VCHO). Alternative cycloalkene oxides include cyclobutene oxide, cyclopentene oxide, norbornene oxide, and cyclooctene oxide. Vinylcycloalkene oxides can be formed from selective olefin epoxidation as known in the art.

When the polycarbonate polymer is prepared by alternating copolymerization with epoxides and carbon dioxide, the structure of alternating polycarbonates differs from traditional condensation polycarbonates in that the polymer backbone contains carbon segments of exactly 2 methylene/methine units alternated with a carbonate linking group. The 2 methylene/methine units are a portion of the non-aromatic cyclic group as illustrated by cyclohexane polycarbonate comprising pendent vinyl and siloxane substituents as follows:

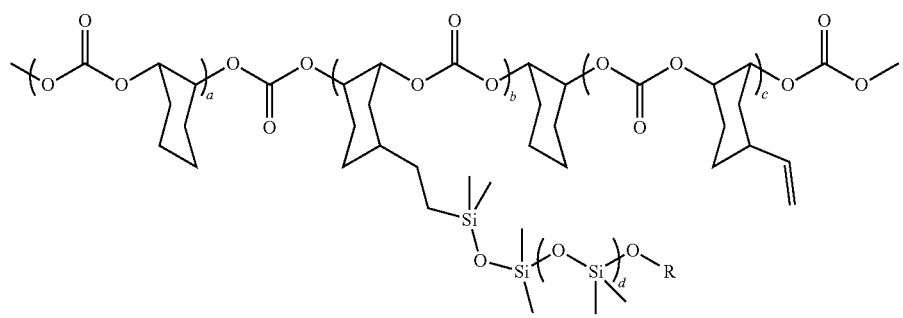

The structure of alternating polycarbonates impacts the chemical stability of these materials. Because a 2-carbon unit separates adjacent carbonate moieties within the mainchain backbone, the polymer is subject to "backbiting" degradation reactions when exposed to alkaline conditions or increased temperature. The kinetics of "backbiting" degradation reactions are influenced by the ring size of the product cyclic carbonate and thus the percentage of carbonate linkages present in the polycarbonate mainchain. The polycarbonate polymers described herein preferably have a high concentration of carbonate linkages, as previously described.

A portion of the polymerized groups of the polycarbonate polymer comprise a vinyl substituent. The vinyl substituent can be further reacted with a siloxane oligomer (e.g. polydimethylsiloxane (PDMS)) have a single hydride group. One representative compound is depicted as follows (wherein $R^4$ is methyl and R is $C_4H_9$).

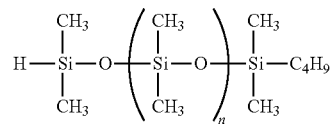

Other siloxane oligomers (e.g. polydimethylsiloxane (PDMS)) have a single hydride group and can be prepared by several methods including anionic polymerization (Hadjichristidis, N.; Hirao, A. Anionic Polymerization: Principles, Practice, Strength, Consequences, and Applications. Springer Japan, 2015, pg. 239). For example, an anionic initiator $LiR^5$ can be used to initiate the anionic ring-opening polymerization of hexamethylcyclotrisiloxane (D3) followed by termination with $(CH_3)_2SiHCl$. Suitable anionic initiators are phenyl lithium, sec-butyl lithium, n-butyl lithium, methyl lithium, benzyl potassium, phenyl sodium, and hexyl lithium. The number of siloxane repeat units, m, can be controlled by the ratio of initiator to monomer as well as by conversion of the monomer.

A representative reaction scheme, not showing the optional groups with non-carbonate (e.g. ether) groups is as follows:

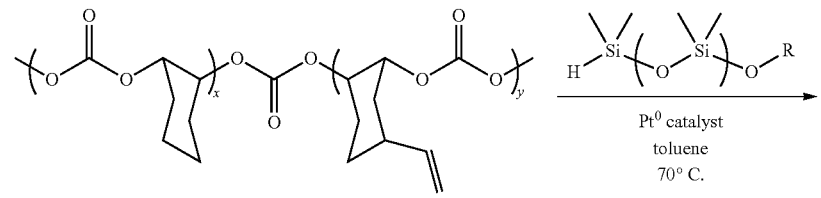

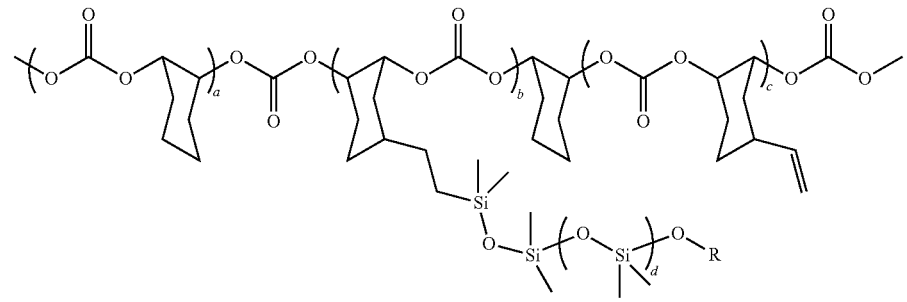

In other embodiments, a composition is described comprising the reaction product of at least one other ethylenically unsaturated material and the (e.g. vinyl-containing) polycarbonate polymer described herein. Various ethylenically unsaturated materials can be combined with the polycarbonate polymer. In some embodiments, the ethylenically unsaturated material is a monomer or oligomer having a molecular weight no greater than 10,000; 5,000; 2500; 1000, 500 or 250 g/mole. The ethylenically unsaturated material is monofunctional, multifunctional, or a mixture thereof. The ethylenically unsaturated material may be aromatic (e.g. phenoxyethyl acylate (PEA), aliphatic (e.g. hexanediol acrylate (HDDA)), or a mixture thereof. The composition can comprise various amounts of the polycarbonate polymer described herein. In some embodiments, the composition comprises more polycarbonate polymer than other ethylenically unsaturated material. For example, the composition may comprise at least 60, 70, 80, or 90 wt. % of the polycarbonate polymer described herein and at least 10, 15, 20, 25, 30, 35, or 40 wt. % of the other ethylenically unsaturated material.

The polycarbonate polymer alone or copolymerized with another ethylenically unsaturated material can be utilized as a low surface energy film or coating. The low surface energy coating or film may be characterized by the contact angles with water as previously described.

Examples

Unless otherwise noted, all parts, percentages, ratios, etc. in the Examples and the rest of the specification are by weight. Unless otherwise indicated, all other reagents were obtained, or are available from fine chemical vendors such as MilliporeSigma, (Burlington, MA, USA) or may be synthesized by known methods. Table 1 (below) lists materials used in the examples and their sources.

TABLE 1

| Materials List | | |
|---|---|---|
| DESIGNATION | DESCRIPTION | SOURCE |
| Acetone | Acetone obtained as 58019 | MilliporeSigma (Burlington, MA, USA) |
| Basic alumina | Aluminum oxide, activated, basic | MilliporeSigma |
| Borinic anhydride | Diphenylborinic anhydride, 95% | MilliporeSigma |
| $CaH_2$ | Calcium hydride, reagent grade, 95% | MilliporeSigma |
| CHO | Cyclohexene oxide, 98% | MilliporeSigma |
| $CO_2$ | Carbon dioxide, research grade, 99.999% | Airgas (Radnor, PA, USA) |
| DCM | Dichloromethane obtained as OMNISOLV | Millipore Sigma |
| (S)-(−)-α,α-Diphenyl-2-pyrrolidinemethanol | (S)-(−)-α,α-Diphenyl-2-pyrrolidinemethanol, 99% | Oakwood Products (Estill, SC, USA) |
| HDDA | 1,6-hexanediol diacrylate obtained as SR238 | Arkema (Colombes, France) |
| Karstedt's Catalyst | Platinum-divinyl(tetramethyl)siloxane complex, 2% Pt in xylene | Gelest (Morrisville, PA, USA) |
| MEHQ | 4-methoxyphenol | MilliporeSigma |
| Methanol | Methanol obtained as MX0480-6 | MilliporeSigma |
| PDMS-H | Monohydride-terminated poly(dimethylsiloxane), 8-12 cSt, MCR-H11 | Gelest |
| n-Butyllithium | 1.6M solution of n-butyllithium in hexanes | MilliporeSigma |
| PEA | 2-phenoxyethyl acrylate obtained as SR339 | Arkema |
| [PPN]Cl | Bis(triphenylphosphoranylidene)ammonium chloride, 97% | MilliporeSigma |
| THF | Tetrahydrofuran, anhydrous, ≥99.9%, inhibitor-free | MilliporeSigma |
| Toluene | Anhydrous, >99.8% | MilliporeSigma |
| TPO | 2,4,6-trimethylbenzoyldiphenyl phosphine oxide | IGM Resins (Charlotte, NC, USA) |
| VCHO | 4-vinyl-1-cyclohexene 1,2-epoxide, mixture of isomers, 98% | MilliporeSigma |
| $ZnEt_2$ | Diethylzinc, 15% solution in toluene | MilliporeSigma |

General Procedures and Test Methods
Reagent Drying and Reaction Preparation

CHO was stirred over $CaH_2$ overnight, degassed with three freeze-pump-thaw cycles and condensed in a flask containing n-butyllithium (solvent removed in vacuo) cooled in liquid nitrogen. CHO was then thawed in an ice water bath at 0° C. and stirred for 30 minutes (min) before collecting the purified monomer in a flask by vacuum transfer. VCHO was dried by stirring over $CaH_2$ for 12 hours (h) prior to vacuum distillation. (S)-(−)-α,α-Diphenyl-2-pyrrolidinemethanol was freeze-dried from benzene (25 grams (g) in 50 milliliters (mL)) prior to use. [PPN]Cl was dried by recrystallization of 10 g from 50 mL anhydrous DCM layered with 150 mL anhydrous hexanes. PDMS-H was stirred with $CaH_2$ for 12 h before being degassed with three freeze-pump-thaw cycles. Once degassed, PDMS was isolated by filtration in a glovebox.

All other chemicals were used as received.

Prior to polymerization, a 300 mL Parr reactor (Parr Instrument Company, Moline, IL, USA) was sealed and heated to 130° C. The heated reactor was then placed under high vacuum for 12 h (ultimate pressure of −10 millitorr (mtorr)) before being brought into a glovebox for reagent charging.

CHO/VCHO polycarbonates were dried prior to hydrosilylation by freeze drying from benzene (−1 g polymer/3 mL benzene).

Gel Permeation Chromatography (Gpc) The GPC equipment consisted of a 1260 Infinity LC (comprised of quaternary pump, autosampler, column compartment and diode array detector) from Agilent Technologies (Santa Clara, CA, USA) operated at a flow rate of 1.0 mL/min. The GPC column set was comprised of a PLgel MIXED-A (300 millimeter (mm) length×7.5 mm internal diameter) plus a PLgel MIXED-B (300 mm length×7.5 mm internal diameter,) both from Agilent Technologies. The detection consisted of a DAWN HELEOS II 18 angle Light Scattering detector, a VISCOSTAR viscometer and an OPTILAB T-rEX differential refractive index detector, all three from Wyatt Technology Corporation (Santa Barbara, CA, USA). Data were collected and analyzed using software ASTRA version 6 from Wyatt Technology Corporation. The column compartment, viscometer and differential refractive index detector were set to 40° C.

The solvent and eluent (or mobile phase) consisted of tetrahydrofuran (stabilized with 250 parts per million (ppm) of butylated hydroxytoluene) OMNISOLV grade modified with 5% v/v triethylamine (both from MilliporeSigma, Burlington, Massachusetts). Analysis was completed using conventional GPC methods and polystyrene molecular weight standards.

Differential Scanning Calorimetry (DSC)

The specimens were prepared for thermal analysis by weighing and loading the material into DSC sample pans. The specimens were analyzed using a DSC2500 (TA Instruments, New Castle, DE, USA) utilizing a heat-cool-heat method (−50° C. to 200° C. at 10° C./minute). After data collection, the thermal transitions were analyzed using the TRIOS Software version 5.0 from TA Instruments. If present, any glass transitions (Tg) or significant endothermic or exothermic peaks were evaluated based on second heat flow curve. The glass transition temperatures were evaluated using the step change in the heat flow curve. The onset and midpoint (half height) of the transition were noted at the glass transition. Peak area values and/or peak minimum/maximum temperatures were also determined. Peak integration results were normalized for sample weight and reported in joules per gram (J/g).

Thermogravimetric Analysis (TGA)

Prepared polycarbonates were analyzed on a thermogravimetric analyzer (DISCOVERY TGA from TA Instruments) under nitrogen purge using a temperature ramp of 5° C./minute from room temperature (23° C.) to 450° C. After data collection, the onset and endpoint of polymer degradation were analyzed using the TRIOS Software version 5.0 from TA Instruments.

Nuclear Magnetic Resonance (NMR)

A portion of the polymer sample was analyzed as a solution of unknown concentration (generally approximately 12 mg/mL) in CDCl3. NMR spectra were acquired on a Bruker AVANCE 600 MHz NMR spectrometer (Bruker, Billerica, MA, USA) equipped with an inverse cryoprobe.

Water Contact Angle Testing

Polymer samples were dissolved at 10% by weight in 1-methoxy-2-propanol. Coatings of the resulting solutions were applied to 2.5×7.5 cm glass microscope slides (Fisher Scientific, Hampton, NH, USA) using a #12 wire wound rod (BYK, Inc., Wesel, Germany), and dried in an oven held at 80° C. for 20 minutes. Contact angles were measured using the Sessile Drop Method with a goniometer (Rame Hart Instrument Company, Succasunna, NJ, USA). A 10 μL drop of water was applied to the surface with a needle. To determine the advancing contact angle, the drop volume was increased in 5 μL increments, and the contact angle was measured as the drop expanded across the surface. To determine the receding contact angle, the water drop volume was reduced in 5 μL increments, and the contact angle was measured as the drop retracted across the surface.

Preparative Examples

Preparative Example 1 (PE-1): Synthesis of CHO/VCHO Copolymers Using a Boron-Based Catalyst A representative procedure is described as follows for PE-IA. In a nitrogen-filled glovebox, THF (50.0 mL), CHO (40 mL), VCHO (10 mL), [PPN]Cl (250 milligrams (mg), 0.436 millimoles (mmol)), and borinic anhydride (160 mg, 0.436 mmol) were added a 300 mL Parr reactor. The reactor was sealed and attached to a $CO_2$ tank via transfer line. The transfer line was purged with $CO_2$ by pressurization and venting (3×200 psi (1.38 MPa). Stirring was initiated and $CO_2$ was introduced until a constant pressure of 200 psi could be achieved. After 1 hour, the reactor was heated to 60° C. and placed under 400 psi (2.76 MPa) $CO_2$. The polymerization was allowed to proceed at 60° C. and 400 psi (2.76 MPa) $CO_2$ for 16 h after which time the reactor was allowed to cool to room temperature. Upon cooling, the viscosity of the reaction solution increased markedly. The reactor was then slowly vented while stirring. Once vented, 150 mL THF was added to further dissolved/dilute the reaction product. CHO/VCHO polycarbonate was precipitated from methanol (−600 mL) and re-precipitated from THF/methanol before being isolated by filtration. The obtained polymer was dried under reduced pressure to afford a colorless solid (22 g). PE-1B was prepared in a similar manner with corresponding adjustments to reactant amount. The results of analysis of PE-IA and PE-1B are shown on Table 2. The mol % of monomer incorporation was obtained by NMR analysis. The Mn, Mw, and PDI were obtained by GPC analysis and reported for each individual peak of the bimodal distributions. Both samples were bimodal by GPC analysis. PE-IA contained ~35% mass higher molecular weight polycarbonate and PE-1B contained ~37% higher molecular weight polycarbonate. The Tg was obtained by DSC analysis. The TGA Onset temperature was obtained by TGA analysis.

TABLE 2

Analysis of CHO/VCHO polycarbonates prepared using borinic anhydride.

| PREPARATIVE EXAMPLE | CHO—$CO_2$ (mol %) | VCHO—$CO_2$ (mol %) | Mn (kg/mol) | Mw (kg/mol) | PDI | $T_g$ (° C.) | TGA Onset (° C.) |
|---|---|---|---|---|---|---|---|
| PE-1A | 75.1 | 24.9 | 23.8 | 24.8 | 1.04 | 80.4 | n.m. |
|  |  |  | 10.8 | 11.5 | 1.06 |  |  |
| PE-1B | 80.7 | 19.3 | 18.6 | 19.4 | 1.04 | 78.4 | 241.8 |
|  |  |  | 8.27 | 8.77 | 1.06 |  |  |

Preparative Example 2: Synthesis of CHO/VCHO Copolymers Using a Zinc-Based Catalyst Polymer PE-2 was synthesized by a procedure adapted from Nozaki et. al. (J. Am. Chem. Soc., 1999, 121, 11008). Zn catalyst was prepared in a glovebox by addition of $ZnEt_2$ (3.5 mL) to a stirring toluene (45 mL) solution of (S)-(-)-α,α-Diphenyl-2-pyrrolidinemethanol (1.0 g). The heterogenous mixture was then heated to 60° C. for 2 hours prior to use.

In a nitrogen-filled glovebox, CHO (40 mL) and VCHO (10 mL) were added to a 300 mL Parr reactor equipped with a glass liner. The Zn catalyst mixture described above was then added before the reactor was sealed and attached to a $CO_2$ tank via transfer line. The transfer line was purged with $CO_2$ by pressurization and venting (3×200 psi, 1.38 MPa). Stirring was initiated and $CO_2$ was introduced until a constant pressure of 200 psi (1.38 MPa) could be achieved. The reactor then heated to 60° C. Once the temperature reached 60° C., the pressure of the reaction was maintained at 500 psi+/−50 psi (3.45+/−0.35 MPa) for 16 hours. After ~12 hours, stirring was not able to be maintained owing to the high viscosity of the reaction mixture.

Once complete, the reactor was cooled and vented before a clear, colorless monolith was extracted. The product was dissolved in THF (~80 mL) before being precipitated from methanol (~500 mL) and isolated by filtration. Residual Zn catalyst was removed by redissolving the white polymer in DCM (~300 mL) and washing with 1 M aqueous HCl in a separatory funnel (3×400 mL) followed by deionized (DI) water (1×400 mL). The resulting polymer solution was added to methanol (~600 mL) to precipitate a white product that could isolated by filtration. Drying under high vacuum afforded 55 g (76% yield) alternating polycarbonate.

The results of analysis of PE-2 are shown on Table 3. The mol % of monomer incorporation was obtained by NMR analysis. The Mn, Mw, and PDI were obtained by GPC analysis and reported for each individual peak of the bimodal distribution. The Tg was obtained by DSC analysis. The TGA Onset temperature was obtained by TGA analysis.

TABLE 3

Analysis of CHO/VCHO polycarbonate prepared using Zn catalyst.

| PREPARATIVE EXAMPLE | CHO—$CO_2$ (mol %) | VCHO—$CO_2$ (mol %) | Mn (kg/mol) | Mw (kg/mol) | PDI | $T_g$ (° C.) | TGA Onset (° C.) |
|---|---|---|---|---|---|---|---|
| PE-2 | 75.1 | 24.9 | 639 | 1440 | 2.25 | 69.5 | 271.9 |
|  |  |  | 16.0 | 30.9 | 1.93 |  |  |

Examples

Examples 1 TO 3: Hydrosilylation of CHO/VCHO Polycarbonate

A representative procedure is described for EX-3. Under an Ar atmosphere, Dried CHO/VCHO polymer PE-2 (50.0 g, 74.0 mmol pendent —C=C) was dissolved in toluene (150 mL) in a 350 mL sealable glass pressure vessel. Once dissolved, PDMS-H (6.5 g, 4.7 mmol Si—H) was added followed by 5 drops of Karstedt's Catalyst. The reaction was then heated to 75° C. for 16 hours over which time the color changed from faint yellow to dark orange/brown. The reaction was then cooled and precipitated from methanol (400 mL) to give a viscous gum precipitate and a cloudy supernatant which was removed by decantation. The off-white polymeric product was re-precipitated from THF/methanol before being isolated by filtration. The obtained polymer was dried under reduced pressure to afford an off-white solid. All other Examples on Table 4 were prepared in a similar manner. The identity and amount of the precursor CHO/VCHO polymer, the amount of toluene, and the amount of PDMS-H employed in each Example are shown in Table 4. The results of NMR (mol % data) and DSC (Tg) analysis are also shown in Table 4.

TABLE 4

Reagent amounts and analysis of product hydrosilylated CHO/VCHO.

| Sample | Precursor | Toluene (mL) | PDMS-H (g) | CHO/VCHO (g) | VCHO—$CO_2$ (mol %) | Hydrosil VCHO—$CO_2$ (mol %) | $T_g$ (° C.) |
|---|---|---|---|---|---|---|---|
| EX-1 | PE-1A | 55 | 5.1 | 22.9 | 17.4 | 3.2 | 79.3 |
| EX-2 | PE-1B | 36 | 6 | 15.2 | 15.4 | 5.2 | 73.6 |
| EX-3 | PE-2 | 150 | 6.5 | 50.0 | 14.8 | 2.0 | 63.8 |

Examples EX-1 to EX-3 were tested for advancing and receding water contact angles according to the General Procedure for Water Contact Angle Testing. The Results are shown in Table 5.

TABLE 5

Water Contact Angle Testing Results

| EXAMPLE | ADVANCING WATER (°) | RECEDING WATER (°) |
|---|---|---|
| EX-1 | 108.4 ± 0.3 | 87.1 ± 1.0 |
| EX-2 | 109.0 ± 1.7 | 72.0 ± 1.1 |
| EX-3 | 106.1 ± 2.2 | 80.1 ± 2.1 |

Examples 4 AND 5: Photo-Crosslinked Coatings

The polymer of Example 1 (EX-1) was dissolved at 20% solids in 1-methoxy-2-propanol. Acrylates HDDA and PEA were each dissolved at 20% solids in 1-methoxy-2-propanol. TPO was dissolved at 10% solids in 1-methoxy-2-propanol. MEHQ was dissolved at 1% solids in 1-methoxy-2-propanol. Polymer/acrylate coating solutions were then prepared by mixing 1.40 g of polycarbonate solution, 0.60 g of acrylate solution (HDDA for Example A and PEA for Example B), and 40 mg of MEHQ solution. 50 mg of each polymer/acrylate coating solution were placed in DSC pans, and the solvent was evaporated by heating in an oven held at 70° C. for 3 hours. The dried polymer/acrylate mixtures were then analyzed by DSC. The results are shown in Table 6 (under EX-4 Uncured and EX-5 Uncured).

To 1.50 g aliquots of the polymer/acrylate solutions, 60 mg of TPO solution was added. Coatings were then cast by drop-coating 1.0 mL of these resulting solutions on glass microscope slides (25 mm×75 mm, from Fisher Scientific, Hampton, NH, USA), then drying in an oven held at 70° C. for 30 minutes. The coatings were cured using a Fusion D-bulb conveyor system (Fusion Light Hammer 10, Heraeus, Hanau, Germany) at 100% intensity and a belt speed of 30 feet per minute. The system was purged with flowing nitrogen, and the coatings were subjected to 3 passes through the system. The coatings were tested for advancing and receding water contact angles according to the General Procedure for Water Contact Angle Testing. The results of this testing are shown in Table 7. A small amount of each coating was scraped off the glass with a razor blade, then placed in a DSC pan and analyzed. The results of this testing are shown in Table 6 (under EX-4 Cured and EX-5 Cured).

TABLE 6

DSC Results for EX-4 and EX-5 before and after photo-crosslinking

| EXAMPLE | ACRYLATE | Tg ONSET (° C.) | Tg MIDPOINT (° C.) |
|---|---|---|---|
| EX-4 Uncured | HDDA | No transition observed | No transition observed |
| EX-5 Uncured | PEA | −15.5 | −2.7 |
| EX-4 Cured | HDDA | 61.6 | 75.7 |
| EX-5 Cured | PEA | 33.5 | 49.4 |

TABLE 7

Water contact angle results for EX-4
and EX-5 after photo-crosslinking

| EXAMPLE | ADVANCING WATER (°) | RECEDING WATER (°) |
|---|---|---|
| EX-4 Cured | 109.5 ± 1.1 | 81.9 ± 2.8 |
| EX-5 Cured | 106.6 ± 0.6 | 82.6 ± 3.0 |

What is claimed is:

1. A polycarbonate polymer comprising non-aromatic cyclic groups bonded with carbonate linking groups wherein a portion of the non-aromatic cyclic groups comprise a substituent
comprising siloxane repeat units having the formula:

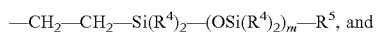

—$CH_2$—$CH_2$—$Si(R^4)_2$—$(OSi(R^4)_2)_m$—$R^5$, and

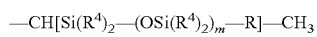

—$CH[Si(R^4)_2$—$(OSi(R^4)_2)_m$—$R]$—$CH_3$ wherein m is the number of siloxane repeat units and $R^4$ and $R^5$ are independently alkyl, aryl, aralkyl or aralkylene,
wherein the polycarbonate polymer has a Tg of at least 50 and no greater than 100° C.

2. The polycarbonate polymer of claim 1 wherein the carbonate linking groups are present in an amount of at least 85 mol % based on the total linking groups of the polycarbonate polymer.

3. The polycarbonate polymer of claim 1 wherein the polycarbonate polymer comprises non-carbonate linking groups in an amount less than 15 mol % based on the total linking groups of the polymer.

4. The polycarbonate polymer of claim 1 wherein the polymer comprises polymerized units of unsubstituted non-aromatic cyclic groups is an amount ranging from 60 to 98.5 mol %.

5. The polycarbonate polymer of claim 1 wherein the polycarbonate polymer comprises polymerized units of non-aromatic cyclic groups comprising a vinyl substituent in an amount ranging from 1 to 30 mol %.

6. The polycarbonate polymer of claim 1 wherein the polymer comprises polymerized units of non-aromatic cyclic groups comprising a substituent having siloxane repeat units in an amount ranging from 0.5 to 10 mol %.

7. The polycarbonate polymer of claim 1 wherein the polycarbonate polymer has the formula:

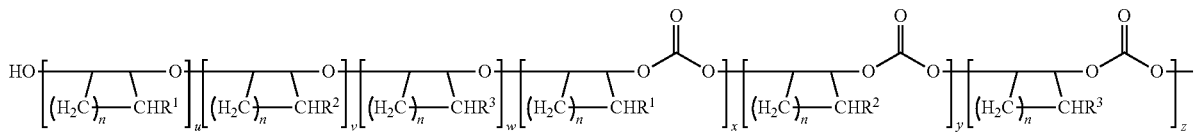

wherein n independently ranges from 1 to 5,
$R^1$ is vinyl,
$R^2$ is hydrogen,
$R^3$ is independently —$CH_2$—$Si(R^4)_2$—$(OSi(R^4)_2)^m$—$R^5$
or —$[Si(R^4)_2$—$(OSi(R^4)_2)^m$—$R^5]$—$CH_3$,
$R^4$ and $R^5$ are independently alkyl, aryl, aralkyl or aralkylene, and
u, V, W, x, y, and z are the number of each polymerized units.

8. The polycarbonate polymer of claim 7 wherein u+v+w are a value such that the polycarbonate polymer comprises less than 15 mol % of such polymerized units.

9. The polycarbonate polymer of claim 1 wherein the polycarbonate polymer has a weight average molecular weight (Mw) ranging from 5,000 to 1,500,000 g/mol.

10. The polycarbonate polymer of claim 1 wherein the polycarbonate polymer has a number average molecular weight (Mn) ranging from 5,000 to 750,000 g/mol.

11. The polycarbonate polymer of claim 1 wherein the polycarbonate polymer has a thermogravimetric mass loss onset temperature in the range from 220-300° C.

12. The polycarbonate polymer of claim 1 wherein the polymer has a higher receding contact angle with water than the same polymer without the siloxane substituents.

13. A composition comprising the reaction product of at least one ethylenically unsaturated material and a polycarbonate polymer comprising non-aromatic cyclic groups bonded with carbonate linking groups wherein a portion of the non-aromatic cyclic groups comprise a substituent comprising siloxane repeat units having the formula:

—CH$_2$—CH$_2$—Si(R$^4$)$_2$—(OSi(R$^4$)$_2$)$_m$—R$^5$, or

—CH[Si(R$^4$)$_2$—(OSi(R$^4$)$_2$)$_m$—R$^5$]—CH$_3$ wherein m is the number of siloxane repeat units and R$^4$ and R$^5$ are independently alkyl, aryl, aralkyl or aralkylene.

14. The composition of claim 13 wherein ethylenically unsaturated material is monofunctional, multifunctional, or a mixture thereof.

15. The composition of claim 14 wherein ethylenically unsaturated material is aromatic, aliphatic, or a mixture thereof.

16. The composition of claim 13 wherein the composition has a higher receding contact angle with water than the same composition without the polycarbonate polymer.

17. The composition of claim 1 wherein the polycarbonate polymer is the reaction product of a polycarbonate polymer comprising non-aromatic cyclic groups wherein a portion of the cyclic groups comprise a vinyl moiety and a hydride moiety of a compound comprising siloxane repeat units and a single hydride moiety.

18. A polycarbonate polymer comprising non-aromatic cyclic groups bonded with carbonate linking groups wherein a portion of the non-aromatic cyclic groups comprise a substituent comprising siloxane repeat units having the formula:

—CH$_2$—CH$_2$—Si(R$^4$)$_2$—(OSi(R$^4$)$_2$)$_m$—R$^5$, or

—CH[Si(R$^4$)$_2$—(OSi(R$^4$)$_2$)$_m$—R$^5$]—CH$_3$ wherein m is the number of siloxane repeat units and R$^4$ and R$^5$ are independently alkyl, aryl, aralkyl or aralkylene; wherein the polycarbonate polymer comprises polymerized units of non-aromatic cyclic groups comprising a vinyl substituent in an amount ranging from 1 to 30 mol %.

19. The polycarbonate polymer of claim 18 wherein the polymer comprises polymerized units of unsubstituted non-aromatic cyclic groups in an amount ranging from 60 to 98.5 mol %.

* * * * *

UNITED STATES PATENT AND TRADEMARK OFFICE
CERTIFICATE OF CORRECTION

PATENT NO. : 12,281,199 B2
APPLICATION NO. : 18/706766
DATED : April 22, 2025
INVENTOR(S) : Carl A. Laskowski Page 1 of 1

It is certified that error appears in the above-identified patent and that said Letters Patent is hereby corrected as shown below:

In the Claims

Column 19

Line 16, In Claim 1, delete "and" and insert -- or --, therefor.

Line 17-18 (approx.), In Claim 1, delete "CH[Si($R^4$)$_2$—(OSi($R^4$)$_2$)$_m$—R]—CH$_3$" and insert -- CH[Si($R^4$)$_2$—(OSi($R^4$)$_2$)$_m$—$R^5$]—CH$_3$ --, therefor.

Line 34, In Claim 4, delete "cyclic groups is an amount" and insert -- cyclic groups in an amount --, therefor.

Line 58-59 (approx.), In Claim 7, delete "—CH$_2$—Si($R^4$)$_2$—(OSi($R^4$)$_2$)$^m$ —$R^5$] or —[Si($R^4$)$_2$—(OSi($R^4$)$_2$)$^m$ —$R^5$]—CH$_3$" and insert -- "—CH$_2$—Si($R^4$)$_2$—(OSi($R^4$)$_2$)$_m$ —$R^5$] or —[Si($R^4$)$_2$—(OSi($R^4$)$_2$)$_m$ —$R^5$] —CH$_3$ --, therefor.

Line 63, In Claim 7, delete "V,W," and insert -- v, w, --, therefor.

Signed and Sealed this
Sixteenth Day of September, 2025

Coke Morgan Stewart
*Acting Director of the United States Patent and Trademark Office*